(12) United States Patent
Normil

(10) Patent No.: US 11,565,576 B2
(45) Date of Patent: Jan. 31, 2023

(54) SNOW ROOF PROTECTOR

(71) Applicant: Johnny Normil, Medford, MA (US)

(72) Inventor: Johnny Normil, Medford, MA (US)

( * ) Notice: Subject to any disclaimer, the term of this patent is extended or adjusted under 35 U.S.C. 154(b) by 259 days.

(21) Appl. No.: 17/151,138

(22) Filed: Jan. 16, 2021

(65) Prior Publication Data

US 2021/0221207 A1     Jul. 22, 2021

Related U.S. Application Data

(60) Provisional application No. 62/962,877, filed on Jan. 17, 2020.

(51) Int. Cl.
      *B60J 11/04*       (2006.01)

(52) U.S. Cl.
      CPC ..................... *B60J 11/04* (2013.01)

(58) Field of Classification Search
      CPC ................... B60J 11/04; B60J 11/00
      See application file for complete search history.

(56) References Cited

U.S. PATENT DOCUMENTS

| | | | |
|---|---|---|---|
| 3,520,257 A | 7/1970 | James | |
| 3,957,301 A | 5/1976 | Huber | |
| 4,848,827 A | 7/1989 | Ou | |
| 5,413,396 A * | 5/1995 | Poznansky | ............... B60J 11/00 296/136.13 |
| 6,206,451 B1 * | 3/2001 | Maano | ..................... B60J 11/00 296/99.1 |
| 6,513,858 B1 | 2/2003 | Li et al. | |
| 7,216,917 B2 | 5/2007 | Tadakamalla | |
| 8,419,107 B2 * | 4/2013 | Manchanda | ............. B60J 11/06 296/136.1 |
| 2006/0233095 A1 | 10/2006 | Sedighzadeh | |
| 2011/0088855 A1 * | 4/2011 | Boustani | .................. B60J 11/02 160/370.22 |

(Continued)

FOREIGN PATENT DOCUMENTS

| CN | 205439929 U | 8/2016 |
|---|---|---|
| EP | 0193501 A2 | 9/1986 |

(Continued)

OTHER PUBLICATIONS

Portable Semi-auto Car Tent, in the Product List of present Lanmodo website: www.lanmodo.com The website is accessible in US.

*Primary Examiner* — John K Fristoe, Jr.
*Assistant Examiner* — Justin Caudill

(57) ABSTRACT

This invention provides a cover device mountable to the roof of an automobile for protection from snow and sun, having modular construction including body groups mounted on the front facing and rear facing surfaces of a frame. The frame is supported on a base positioned on the automobile roof by two extendable feet connecting the base to roof racks. The body group contains a number of cover pieces supported on the body supports. Bottom of the body support is fitted into a pair of rails attached to an adjacent body support such that the outer body supports are slidable along the rails and extendable to the extent allowed by the length of the rails. A locking device is installed to interlock the cover pieces within one body group. Body groups are secured to each other so that the body groups are extendable and retractable as a unit.

13 Claims, 10 Drawing Sheets

(56) References Cited

U.S. PATENT DOCUMENTS

2016/0288635 A1 10/2016 Morazan
2018/0043761 A1* 2/2018 May ........................ E04H 15/12

FOREIGN PATENT DOCUMENTS

| GB | 2177359 A | 1/1987 | |
|---|---|---|---|
| WO | WO-2007099384 A1 * | 9/2007 | .............. B60J 11/00 |
| WO | 2017/045393 A1 | 3/2017 | |
| WO | 2018/076550 A1 | 5/2018 | |

* cited by examiner

SNOW ROOF PROTECTOR

CROSS-REFERENCE TO RELATED APPLICATION

This application claims the priority of Provisional Patent Application No. 62/962,877, filed on Jan. 17, 2020, the contents of which are incorporated herein by reference in their entirety.

TECHNICAL FIELD

The present invention relates to a cover device for automobiles. The invention provides a protective cover for the vehicles against the snow as well as sun. The cover device, mounted on the roof of a vehicle or alike wise, is capable of protecting the vehicle against snow and ice, especially protecting the windshields, from the perilous, cumbersome, and inconvenient conditions due to the deposit of snow on the vehicle.

BACKGROUND

Every year, the number of automobiles keeps growing along with living standards in the modern world. The resulting shortage of covered parking lots and other covered parking areas have led more people to park their automobiles on the roads or outside. As well known, automobiles have large areas of glass, which if uncovered in hot weather traps solar energy and overheats the automobile interior and in cold weather tends to frost over or freeze precipitation. A prompt snowfall crown on top of ice makes cleaning of automobile windshields a difficult task. To clean them, a person needs tools, strength, and especially time, while being exposed to harsh outdoor temperatures and potentially perilous, cumbersome, and inconvenient conditions.

A traditional blanket to cover the automobile partially solves the problem. The blanket protects the vehicle, but it does not get rid of the snow. Moreover, the snow is more difficult to remove after freezing onto the blanket. Also, there is a problem in finding a place to store the blanket other than in the luggage compartment, where the blanket may leave very little room for other effects. Snow, rain, and heat may produce mold in the blanket, which may spread in the luggage compartment and contaminate food or other stored items.

For these and many other reasons, most people do not use traditional blanket for protecting an automobile against snow. Furthermore, in the summer, a traditional blanket used as a sun shade may block ventilation air inlets, generating over prolonged time excess humidity and an unhealthy atmosphere for the driver and passengers. From the perspective of providing proper maintenance of automobiles, excess heat or humidity may shorten their lifetime.

The present invention provides an improved cover device for solving the problem of automobile protection against snow and ice, as well as sunlight. The improved cover device readily deploys on the automobile roof to cover the vehicle entirely from the front to back when necessary, resists strong wind, allows snow to be removed with minimal work from the user, and readily stows safely in the luggage compartment after use.

SUMMARY

The cover device comprises a rigid body made of metals, plastics, fiberglass, or any other solid and light engineering materials which are resistant to cold and heat, and are water repellent. Having modular construction, the cover device is simple to handle, quick in deployment, and easy to use and to maintain with little need for tools. The cover device is to cover the automobile entirely from front to back.

The cover device has a convex shape similar to an egg sectioned lengthwise and an ellipsoidal upper surface spanned by cover pieces, providing resistance to strong wind. The cover device includes two sections, a front section opening forwards and a rear section opening rearwards. The sections are mounted to a frame, the front section to a front facing surface of the frame and the rear section to a rear facing surface of the frame. The frame is supported on a base with a rectangular bottom and an upper section whose top surface is in the shape of a cross. The base may be mounted with its rectangular bottom aligned either longitudinally or transversely to the automobile with the frame supported on the top surface oriented so that the sections may open forwards and rearwards. The base serves as a support for the frame and for attachment of extendable feet, which extend or retract horizontally to connect the base to luggage racks or to roof racks clamped to the automobile.

Each of the two sections comprises several body groups. A body group may be in a closed configuration for storage or an open configuration when the cover device is deployed for use. The body group comprises cover pieces, body supports to which the cover pieces are attached, rails attached to the bottom of the body support and engaged slider feet to enable the body group in open and closed configurations, a mounting plate for mounting the body group to the frame, and hardware for locking the body group into either configuration and for securing adjacent body groups to each other.

In the closed configuration, the cover pieces of the body group are positioned one under the other. In the open configuration, the innermost cover piece of the body group remains as in the closed configuration while the other cover pieces extend outwards from the frame towards the front or rear according to whether the body group is mounted to the front or rear facing surface of the frame. In open configuration, the cover pieces of the body group retain some overlap of inner over next outer cover piece, so as to cover areas of the vehicle farther outward from the frame.

The body support is in the shape of an inverted U, with a flattened top to which a cover piece is joined, and downward sloping sides. The convention of "inner" refers to the direction towards the front or rear facing surface of the frame to which a body group is mounted. Each body group has one innermost body support, to which a mounting plate is attached to the inner edge of the body support. The mounting plate engages with fixtures on the front facing or rear facing surface of the frame for mounting the body support. After mounting of the body group, this innermost body support and its cover piece are thus fixed with respect to the frame.

Each body support except the outermost body support of the body group has one pair of rails attached. The rails of a pair are parallel, one rail attached along one bottom edge of the inverted U-shaped body support and the other rail attached to the other bottom edge, and project beyond the body support in the outward direction. Each body support except the innermost body support has two slider feet, one slider foot attached beneath one bottom edge of the body support and the other slider foot attached beneath the other bottom edge. The slider feet of one body support are slidably fitted to the rails of the next inner body support, thereby allowing each outer body support to extend outwards along the pair of rails to the extent allowed by the length of the rails or to retract inwards to the next inner body support. The slider feet of the outermost body support are joined directly to that body support, and the slider feet of a body support intermediate between innermost and outermost body supports would be joined to the bottom of the rails attached to that body support. An inner body support has dimension of height greater than the next outer body support, so that when retracted in closed configuration the outer cover pieces of a body group nest under the innermost cover piece and the rails nest one underneath another, and in open configuration the outer cover pieces extend outward from the frame preserving some overlap of inner over next outer cover piece.

Adjacent body groups within one section are interconnected to each other by cleats attached to the outermost cover pieces, so that the body groups of one section may be opened or closed as a unit by pulling or pushing on a handle. A locking device on cover pieces of one body group locks the body group in an open or closed configuration.

To attach the two extendable feet to the base and to attach the body groups to the frame, a drag-and-paste technique is used, in which a movable male part is set relative to a fixed female part and rotated or slid to mount the male part to the female part without use of tools. For attaching two extendable feet to the base, a male part attached to the extendable foot slides into a female opening attached to the base to connect the extendable foot and base. For attaching a body group to the frame, the mounting plate of the body group as a male part slides into a set of two retainers attached to the frame as the female part. The mounting plate is further supported on a convex horizontal bar. The two retainers and the convex horizontal bar constitute a set of fixtures attached to the frame. Although the drag-and-paste and welding techniques are used for connecting most of the parts, other techniques such as using screws or bolts may be used instead.

Structural integrity is one of the main factors taken into account in design of the cover device which bears the snow weight. The cover device distributes snow load on three strong anchor points, following laws of construction similar to earthquake resistant construction, significantly improving its performance. By its elliptical and convex shape, the cover device is designed for snow to flow off of it with little resistance, to minimize as much as possible the accumulated snow weight and forces needed to remove snow that does accumulate.

The cover may be made of plastic materials, such as polypropylene which is a semi-crystalline resin, or fiberglass which is a composite material, or metal, or any other solid and light materials.

The cover device could weigh around 5 kg to 10 kg (11 lbs-22 lbs) with a height less than one foot (12 inches). The width and length of the cover device are not to exceed dimensions of the vehicle.

While driving the vehicle, the cover device of the present invention is not designed to be left in either open or closed configuration on the roof top. For safety reasons the cover device should be removed before driving, and may be stowed in the luggage compartment.

BRIEF DESCRIPTION OF THE DRAWINGS

The present invention will be described with reference to the following drawings. The drawings are merely examples for illustrative purposes according to the embodiment and are not intended to limit the scope of the present disclosure.

In the figures, a positive number, such as number 1, is used to mark a part in the front section and its derivative, such as number 1', is used to mark the identical part in the rear section. Where a number marks a part that constitutes several elements such as the button assembly 10 and the holders 39, the elements of the part will be marked by the number of the part followed by an alphabetical letter, such as a, b, or c.

DETAILED DESCRIPTION

Reference will now be made in detail to exemplary embodiments of the disclosure, which are illustrated in the accompanying drawings. The same reference numbers will be used throughout the drawings to refer to the same or like parts.

In a first embodiment, the cover device has a total of six body groups, three in the front section and three in the rear section. The three body groups in a section include one center body group and two side body groups, the side body groups located on either side of the center body group.

In this embodiment, each body group includes three cover pieces and three body supports, each cover piece attached to the top of a corresponding body support. Each body group has an innermost body support, which remains fixed with respect to the frame, and two outer body supports that extend outward or retract inward according to whether the body group is in open or closed configuration. The outer body supports each have a pair of slider feet that engage in a pair of rails attached to the next inner body support. Thus, there are two pairs of rails, one pair attached to the innermost body support and one pair of rails attached to the next outer body support, along which the outer two body supports extend or retract. As a result, the body supports within one body group are linked together by rails.

The frame, which supports the body groups mounted to its front facing and rear facing surfaces, comprises three frame parts including a central frame part and two side frame parts, the side frame parts located on either side of the center frame part and interchangeable. Each frame part supports one body group on its front facing surface and one body group on its rear facing surface. Each body group has a mounting plate attached to the inner edge of the innermost body support, the mounting plate engages with corresponding fixtures on a front or rear facing surface of a frame part, so that the body group may be attached to the frame part without tools, by a drag and paste method of engaging the fixtures. The frame is supported by a rectangular base with top surface in the shape of a cross, and the base is attached by two extendable feet that connect the base to two luggage rack bars or two roof racks.

The front facing surface and rear facing surface of a frame part each has a set of the fixtures attached, including a pair of retainers and a convex horizontal bar for the purpose of attaching a body group to the frame.

A locking device comprising a button assembly and a central rail is attached to upper surface of the cover pieces in the center body group for locking the cover pieces within one group in position.

Detailed description of this embodiment follows, with reference to FIGS. 1-11.

Figure 1:
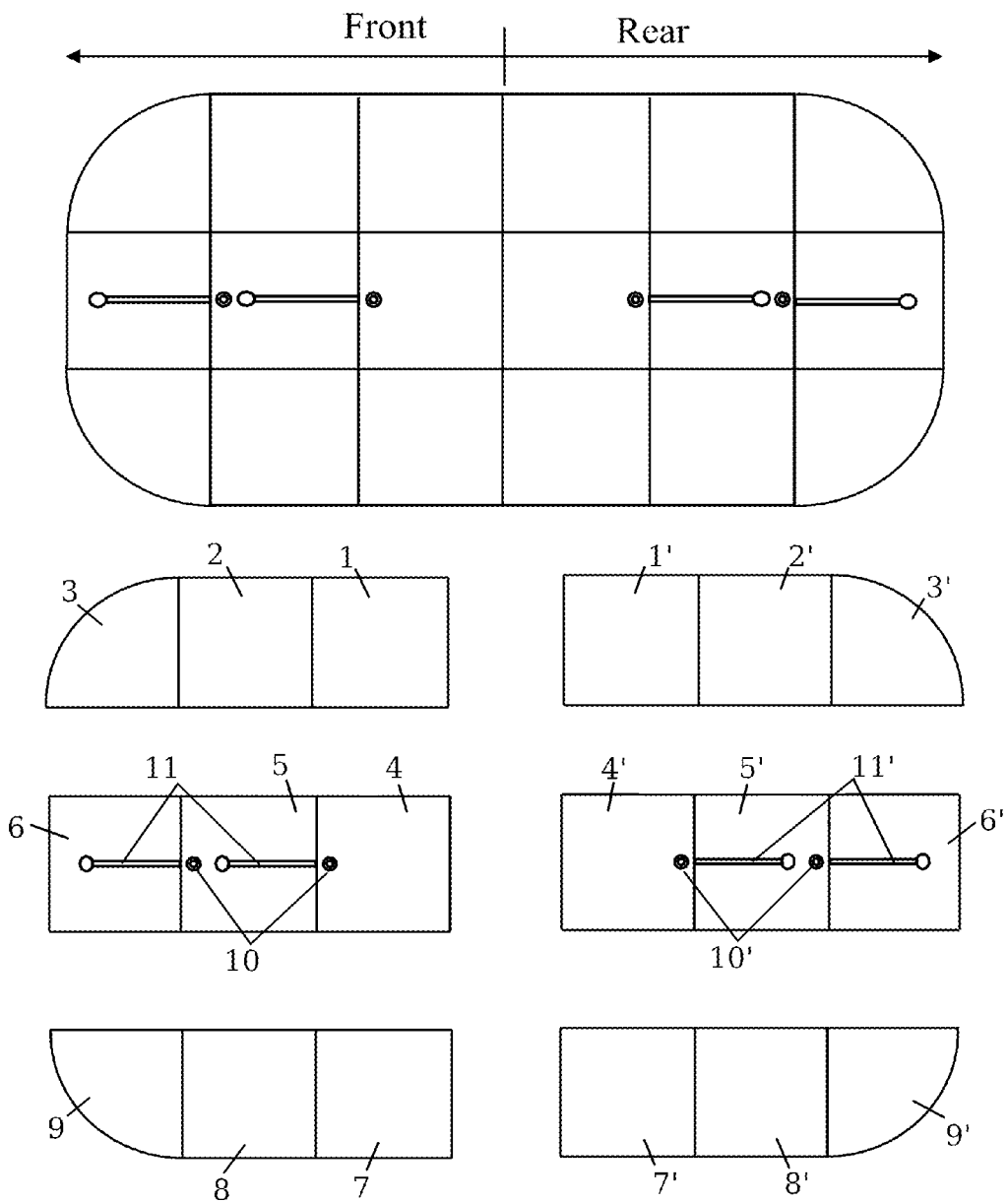
FIG. 1 illustrates an aerial top view of the cover device in the open configuration lengthwise along the vehicle.

Referring to FIG. 1, the cover device is divided a front section and a rear section, each containing nine cover pieces. Each section contains three body groups including a center body group and two side body groups. Each body group contains three cover pieces. For the front section, the cover pieces 1-3 are in one side body group, the cover pieces 4-6 are in the center body group, the cover pieces 7-9 are in the other side body group. For the rear section, the cover pieces 1'-3' are in one side body group, the cover pieces 4'-6' are in the center body group, the cover pieces 7'-9' are in the other side body group. The cover device has symmetry such that the center body groups are interchangeable, the side body groups with cover pieces 1-3 and 7'-9' are interchangeable, and the side body groups with cover pieces 1'-3' and 7-9 are interchangeable.

Figure 2:
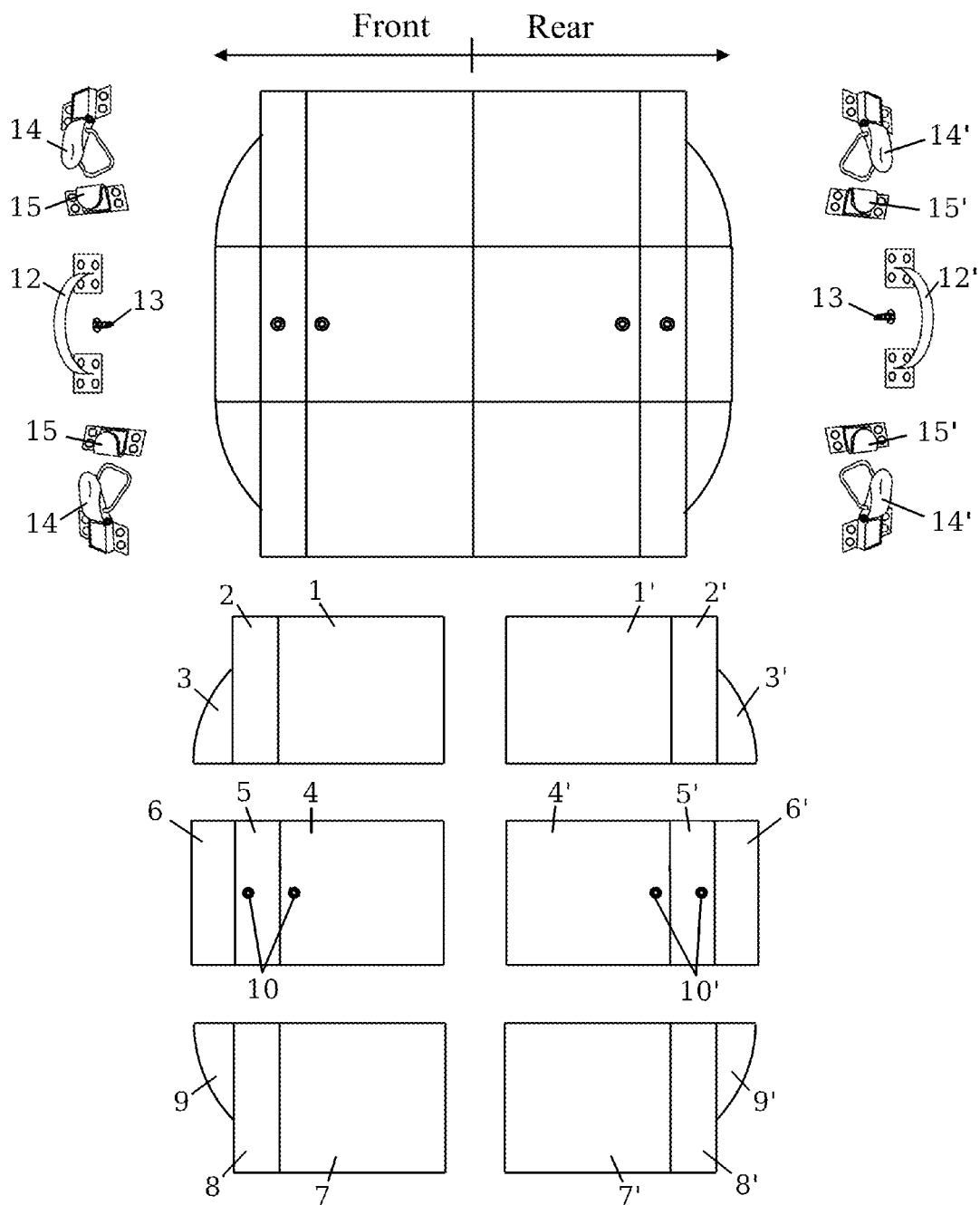
FIG. 2 illustrates an aerial top view of the cover device in the closed configuration lengthwise along the vehicle. Also shown are cleats 14 and 15 to be attached to the underside of the outermost cover pieces to secure the outermost cover pieces of different body groups with each other, and a handle 12 to be attached to the underside of the outermost cover piece in the center group.

As shown in FIG. 2, with the cover device in the closed configuration, the outermost cover pieces 3, 6, 9 nest under the corresponding next inner cover pieces 2, 5, 8, which in turn nest under the corresponding innermost cover pieces 1, 4, 7. The outermost cover piece 3, 9 of each side body group is secured to the outermost cover piece 6 of the center body group by cleats 14, 15 attached to the underside of the outermost cover pieces, and a handle 12 is attached to the underside of the outermost cover piece 6 of the center body group, to enable the cover pieces of a section to be extended or retracted as a unit by pulling or pushing on the handle. Screws 13 are used to attach the cleats and handles. Cleats are used in this embodiment, but other techniques to secure the outermost cover pieces 3,9 of the side body groups to the outermost cover pieces 6 of the center body group may be used instead.

Figure 3:
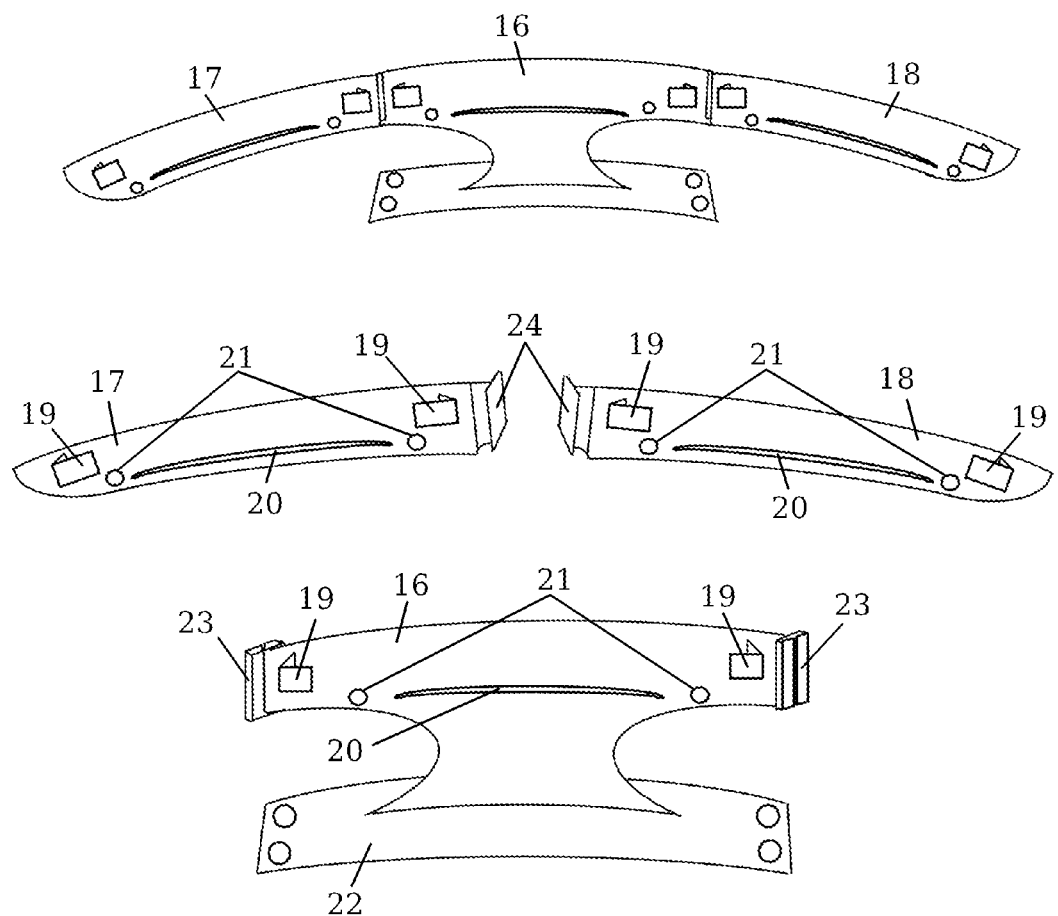
FIG. 3 illustrates a front view of the frame, having a central frame part 16 and two side frame parts 17 and 18 for supporting six body groups, and rectangular plate 22 for attachment to a base.

FIG. 3 illustrates a front view of the frame. The frame comprises three frame parts 16-18 including a central frame part 16 and two side frame parts 17 and 18. In the first image, the three frame parts are assembled as an integral assembly. The central frame part 16 is welded to a rectangular plate 22, which is to connect the frame to the base 32. Holes in the rectangular plate 22 are reserved for screws to secure the frame onto the base 32. Using screws to connect the parts is one of many methods of joining parts. The second image in FIG. 3 shows the three frame parts 16-18 separated. The side frame parts 17 and 18 are identical and interchangeable. The central frame part 16 has at each end a female part 23, which serves as a housing for the male part 24 located at one end of each of the two side frame parts 17 and 18. A drag-and-paste technique is used to join the male part 24 with the female part 23.

Each frame part supports one body group on its front facing surface and one body group on its rear facing surface. On each front facing and each rear facing surface of each frame part are a pair of retainers 19 and convex horizontal bar 20, which form a set of fixtures for engaging a mounting plate 26, shown in FIG. 4, to attach a body group to the frame part surface. The retainer 19 is made from two metal plates welded together, one plate smaller than the other, the smaller plate attached to the surface of the frame part and positioning the larger plate off the surface of the frame part and extending towards the other retainer 19 of the pair. The convex horizontal bar 20 is attached to the surface of the frame part below and centered horizontally between the two retainers 19. The pair of retainers 19 constrain the side edges of the mounting plate 26, and the convex horizontal bar 20 supports the bottom edge of the mounting plate. The set of fixtures is attached to the front facing and rear facing surfaces of each of the three frame parts 16, 17, and 18. There are two through holes 21 in each frame part, the holes symmetrically spaced such that one hole 21 serves as a housing for one peg 25 of a body group mounted to the front surface of the frame part, and the other hole 21 serves likewise for one peg 25' of a body group mounted to the rear face of the frame part.

Figure 4:
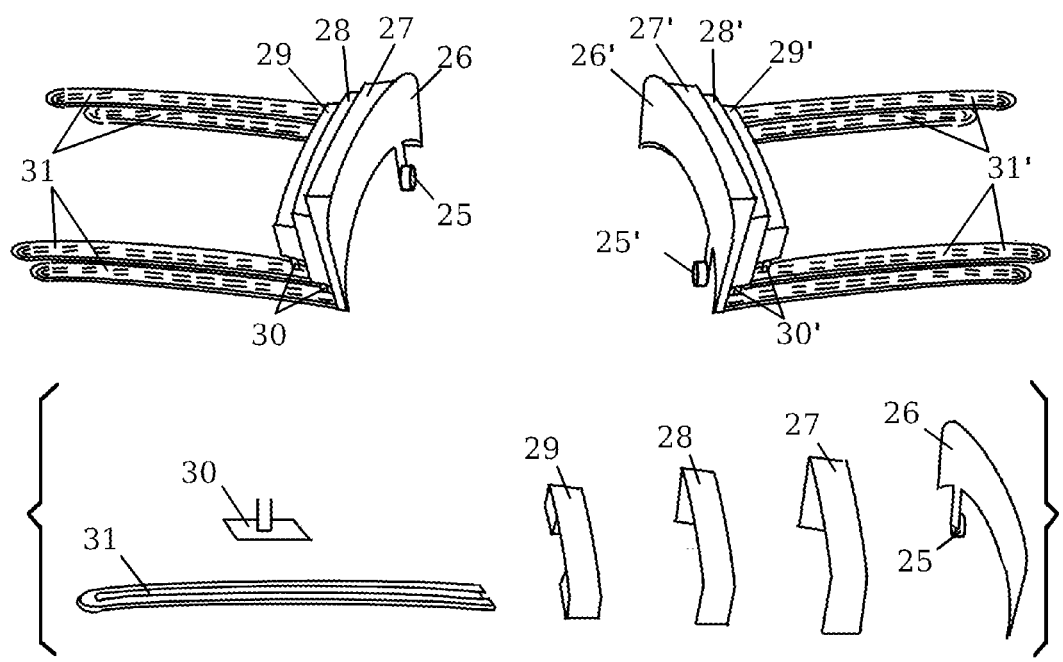
FIG. 4 illustrates a three-dimensional perspective view of two body groups in the closed configuration without cover pieces attached, showing body supports 27-29 and slider feet 30 engaging in rails 31. The exploded view shows the slot in rail 31, the slot is depicted by dashed lines in assemblies including rails. A mounting plate 26 with peg 25 is attached to the innermost body support 27, for mounting the body group to the frame.
Figure 5:
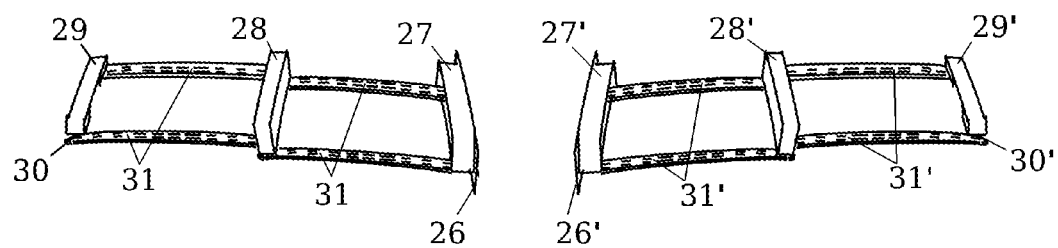
FIG. 5 illustrates a three-dimensional view of two body groups in the open configuration without cover pieces attached, showing body supports 27-29, rails 31, and mounting plate 26 attached to the inner side of the innermost body support 27.

FIGS. 4 and 5 illustrate three-dimensional views of front and rear section body groups without cover pieces attached, in closed and open configurations, respectively, showing the arrangement of body supports 27-29, rails 31, slider feet 30, and mounting plate 26. Each body group without cover pieces attached is identical and interchangeable, providing a modular construction that simplifies manufacture, service, and operation. The innermost body support 27 is attached at its inner edge to mounting plate 26 by which the body group is attached to a front or rear facing surface of a frame part 16-18 shown in FIG. 3. In FIG. 4, a peg 25 is attached to the extension of mounting plate 26. The innermost and next outer body supports 27 and 28 each has a pair of rails 31 attached along the bottom edges of the downward sloping sides of the body support, the rails parallel and projecting outwards, with the rails attached to body support 28 directly above the rails attached to innermost body support 27. Body support 28 and outermost body support 29 each has a pair of slider feet 30 attached beneath the bottom edges of the downward sloping sides of the body support, and slidably engaging into the corresponding rails of the next inner body support. The slider feet of outermost body support 29 are joined directly to that body support, and the slider feet of body support 28 are joined to the bottom of the rails attached to that body support. As shown in FIG. 4, an inner body support has a height greater than the next outer body support, so that in closed configuration the outer cover pieces of a body group would nest under the innermost cover piece, the body supports come close to each other, and the rails lay one underneath another. In open configuration, cover pieces extend outward from the frame preserving some overlap of inner over next outer cover.

Figure 6:
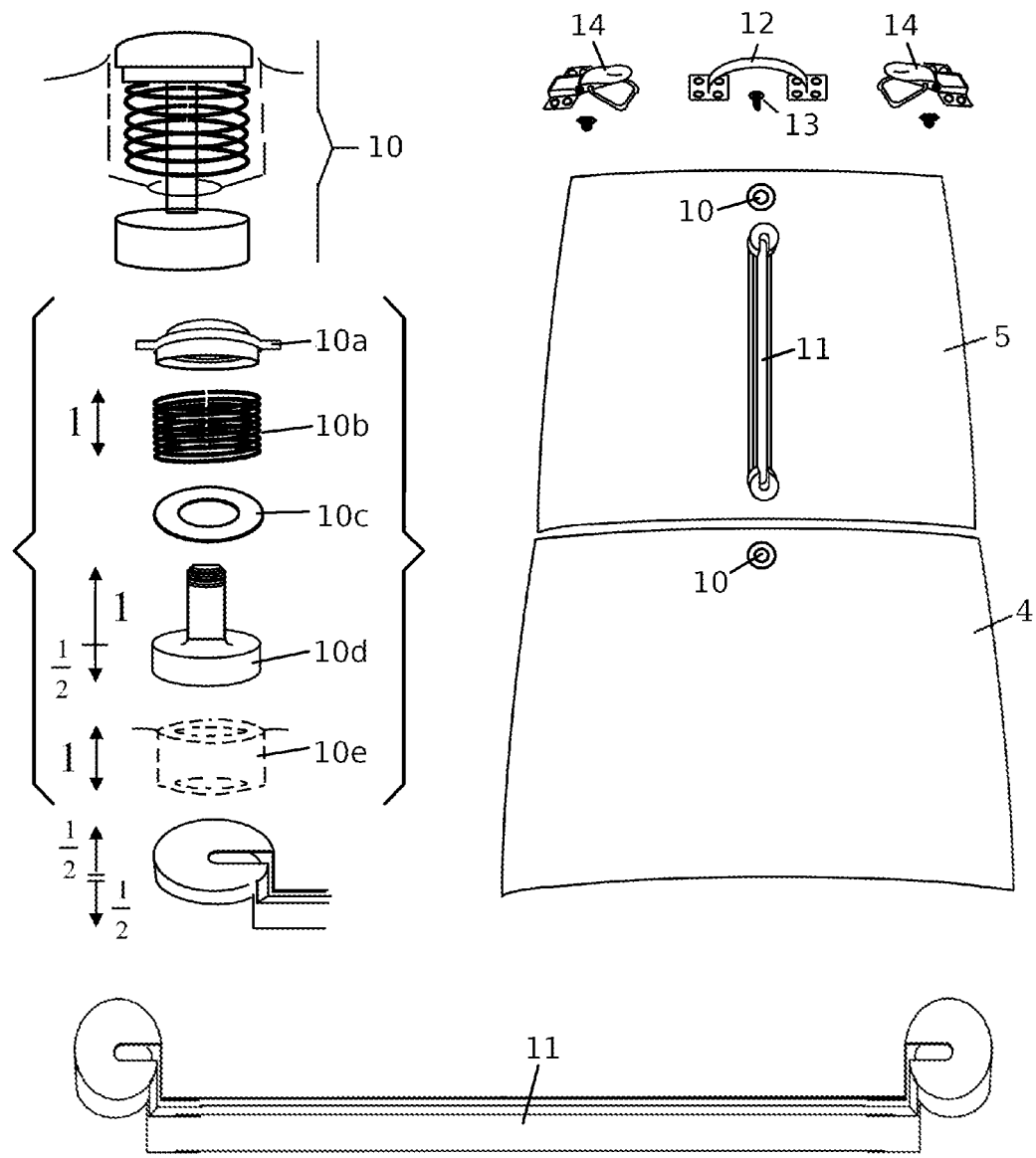
FIG. 6 illustrates a descriptive image of a button assembly 10 and a central rail 11, for locking cover pieces of the center body group in an extended or fully retracted position, showing constituent parts of the button assembly 10, innermost cover piece 4, adjacent cover piece 5, and a central rail 11. The piston 10*d* of the button assembly in an inner cover piece engages in the central rail 11 of the next outer cover piece, locking position at either end of the travel. Also shown are a handle 12 and male halves of cleat 14 for attachment to the underside of the outermost cover piece by screws 13.

FIG. 6 illustrates a button assembly 10 and a central rail 11 of a locking device for locking the cover pieces of the center body group in an extended or fully retracted position. A button assembly 10 mounted through a hole near the outer edge of innermost cover piece 4 engages with central rail 11 attached to the next outer cover piece 5. A second button assembly 10 is shown near the outer edge of cover piece 5, which engages with a central rail 11 on the outermost cover piece 6 of the body group, as shown in FIG. 1.

The locking device allows a cover piece to extend or retract freely, until at either end of available travel of the engagement of button assembly 10 in central rail 11, the cover piece is locked in a fully extended or fully retracted position until released by pressing on top of the button assembly.

Referring in FIG. 6 to the exploded view of button assembly 10, the piston 10*d*, in the form of a circular base with a coaxial stem on one side, is located with circular base beneath the surface of an inner cover piece, with the stem projecting upward through the hole in the cover piece. The circular base engages within a channel of the central rail 11 of the next outer cover piece so that the piston 10*d* slides along the channel as the next outer cover piece is extended or retracted between open and closed configurations of the body group, the piston 10*d* locking position at either end of travel by action of spring 10*b* lifting the circular base of piston 10*d* upwards into circular resting places at ends of the central rail 11. Pressing the rubber head 10*a* returns the circular base into the channel to release the locked position.

Referring again to FIG. 6, the button assembly 10 and central rail 11 are further discussed with exemplary dimensions in inches for this embodiment. The exploded view of button assembly 10 shows a rubber head 10*a* mounted or screwed into the stem of piston 10*d*. The piston 10*d* is 1½" in height and its circular base has an outer diameter selected for slidably fitting within the channel of central rail 11. A spring 10*b* of about 1" in height surrounds the stem of piston 10*d* and serves as a counter-force when the rubber head 10*a* is pressed. The spring 10*b* rests within space 10*e* reserved for the button assembly in the cover piece. A spacer washer 10*c* around the stem of piston 10*d* separates spring 10*b* from the upper surface of the cover piece. The central rail 11 is divided into two halves each ½" in height, in which one half is the circular resting places at ends of the central rail 11 and the other half corresponds to the channel of central rail 11. The space 10*e* of height 1" allows sufficient travel of piston 10*d* between circular resting places and channel of the central rail 11.

Figure 7:
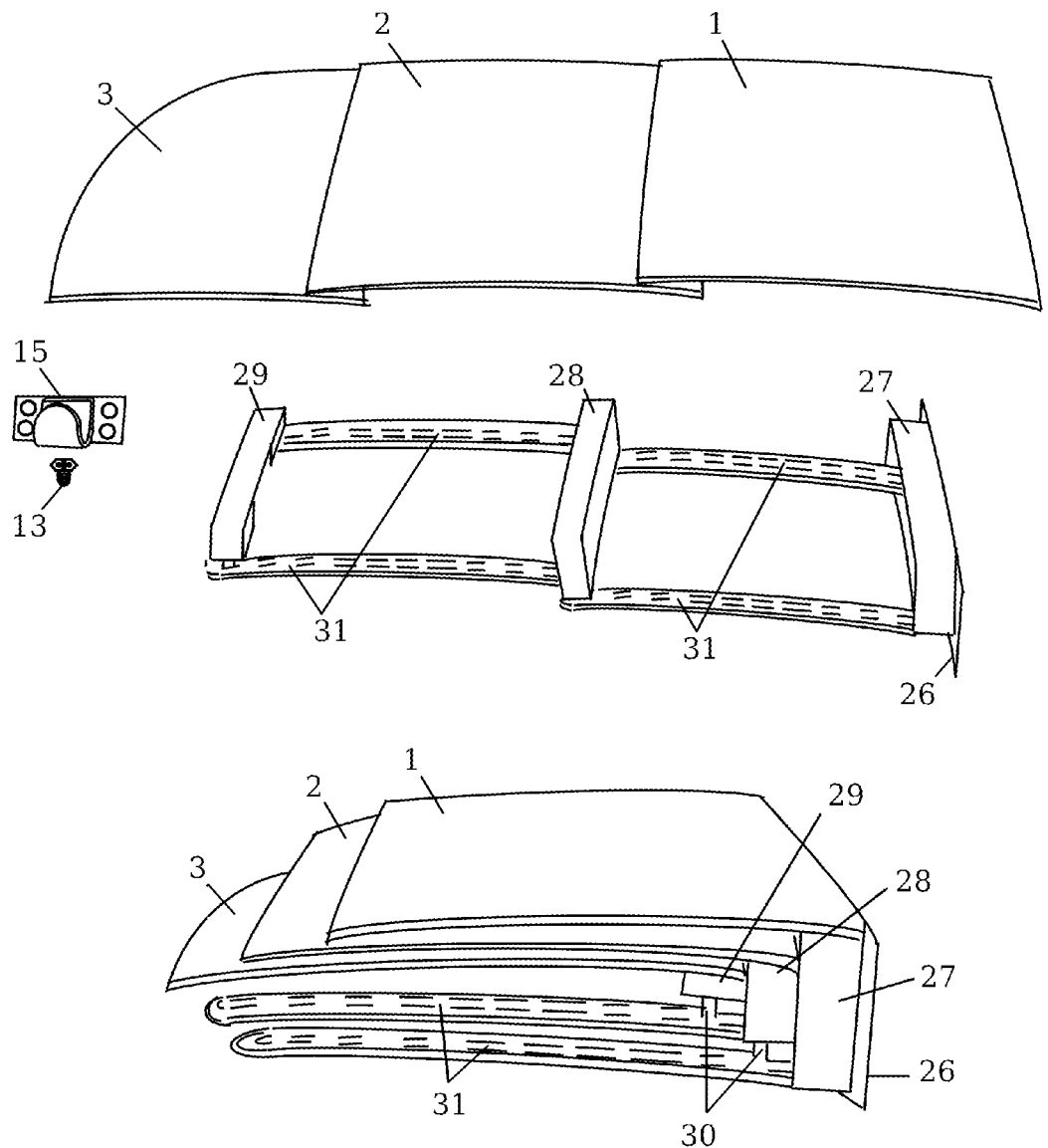
FIG. 7 illustrates a three-dimensional aerial view of a body group in the open and closed configurations. Also shown is a female part of cleat 15 for attachment to the underside of the outermost cover piece 13.

FIG. 7 illustrates a three-dimensional aerial view of a body group in the open and closed configurations. The body group comprises two pairs of rails attached to the body supports. The cover pieces are bound to the flatten tops of the body supports by screws. Other methods such as welding or adhesive binding may be used to bind the cover pieces to the body supports instead. In the first image, the rails and the cover pieces are opened. The cover pieces and rails are shown separately for the purpose of viewing. In the second image, the body group is closed, in which the cover pieces and body supports are stacked into a compact group. Since the body group shown in the figure is a side body group, the female part 15 of the cleat and screw 13 which is to attach the female part 15 to the cover piece 3 are shown.

Figure 8:
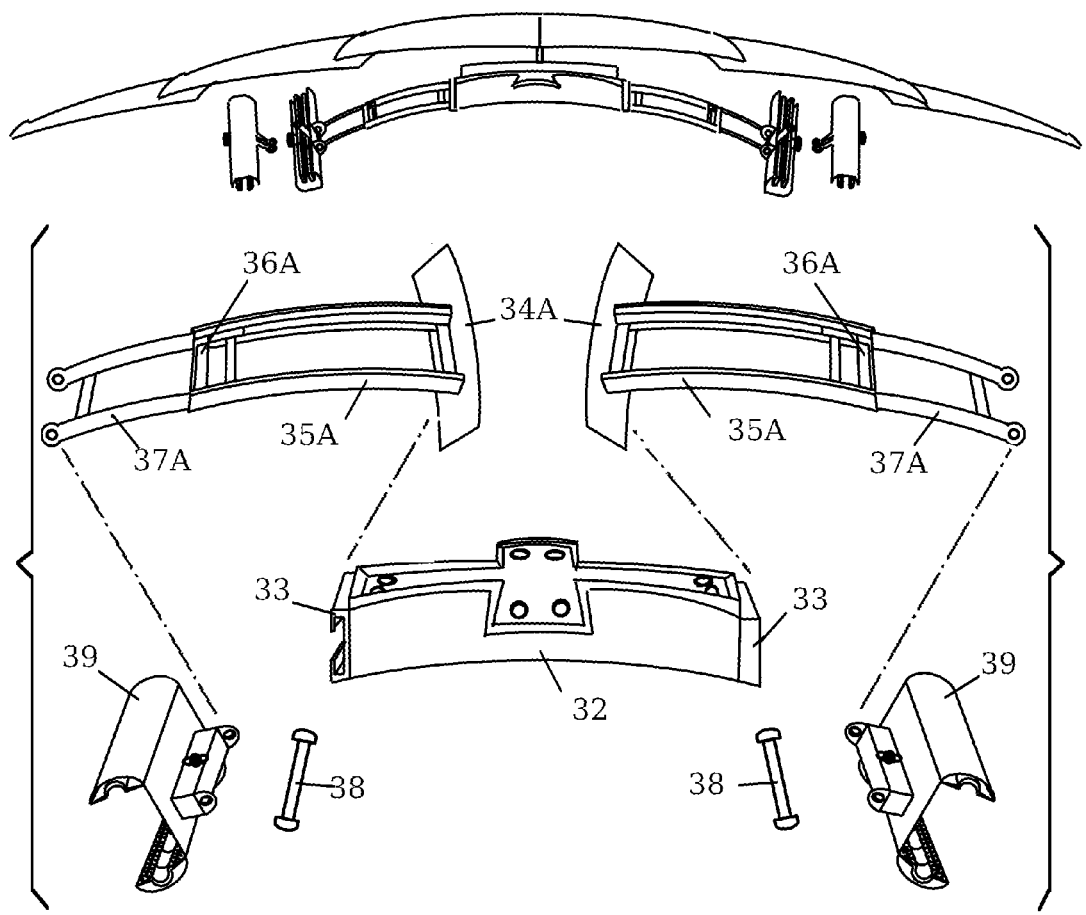
FIG. 8 illustrates a descriptive image of different parts constituting the base, including a base 32 with a top surface in the shape of a cross, and two extendable feet 34A—37A, with holders 39 attached to ends of the extendable feet. A profile view of the cover device is shown in the top section of the figure.

FIG. 8 illustrates a descriptive image of different parts constituting the base 32 and extendable feet 35A-37A. A profile view of the entire cover device is shown at the top of the figure. The figure displays base 32 with lower section in the shape of a rectangular box and top surface of the upper section in the shape of a cross aligned with and centered over the lower section. The upper section in either lengthwise or widthwise direction has the same thickness to accommodate mounting the rectangular plate 22 of the central frame part 16 along either axis of the cross, so that the lower section may be oriented either lengthwise or transversely to the automobile, with frame oriented transversely and the sections of the cover device opening towards the front and rear of the automobile in either case. The top surface of base 32 is convex and bottom is concave in the lengthwise direction of the base. The openings 33 at the ends of the base 32 are accessible to be fitted by the plate 34A which is attached to the extendable feet 35A-37A. The extendable feet are made of parts including an inner leg part 35A having two tracks within which an outer leg part 37A extends or retracts for reaching to the racks for clamping. The small piece 36A, which is in the shape of a bar used as a stopper, is to secure the two leg parts 35A and 37A in position.

Figure 9:
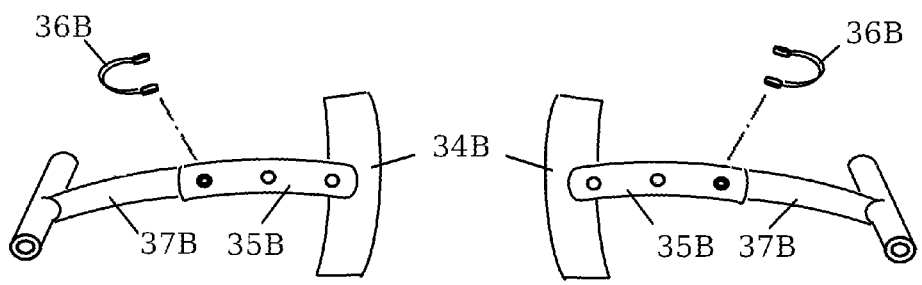
FIG. 9 illustrates two extendable feet 34B-37B of an alternative type.

FIG. 9 shows extendable feet of an alternative type, having plate 34B to fit openings 33 as would plate 34A, but in which outer leg part 37B extends or retracts within a tubular inner leg part 35B. The small piece 36B is used as a spring button to secure the two parts 35B and 37B in position.

For extendable feet of either type, the pin 38 shown in FIG. 8 serves as a link between the outer leg 37A or 37B and the holder 39 allowing them a diarthrosis movement. The holder 39 is used to clamp bars of the luggage rack or roof racks. Each extendable foot is connected to a holder by two eyelets and movable at the contact points in a circular motion of one hundred and eighty degrees (180°). When a lever at the top of each holder is manually rotated as to be screwed or unscrewed, the clamp is mechanically activated from top to bottom either to open or close the clamp on the bars of the luggage rack in order to secure the base on the roof of the vehicle. When the rectangular lower section of the base 32 is aligned transversely to the automobile, the extendable feet may extend transversely to attach to longitudinally mounted luggage racks.

Figure 10:
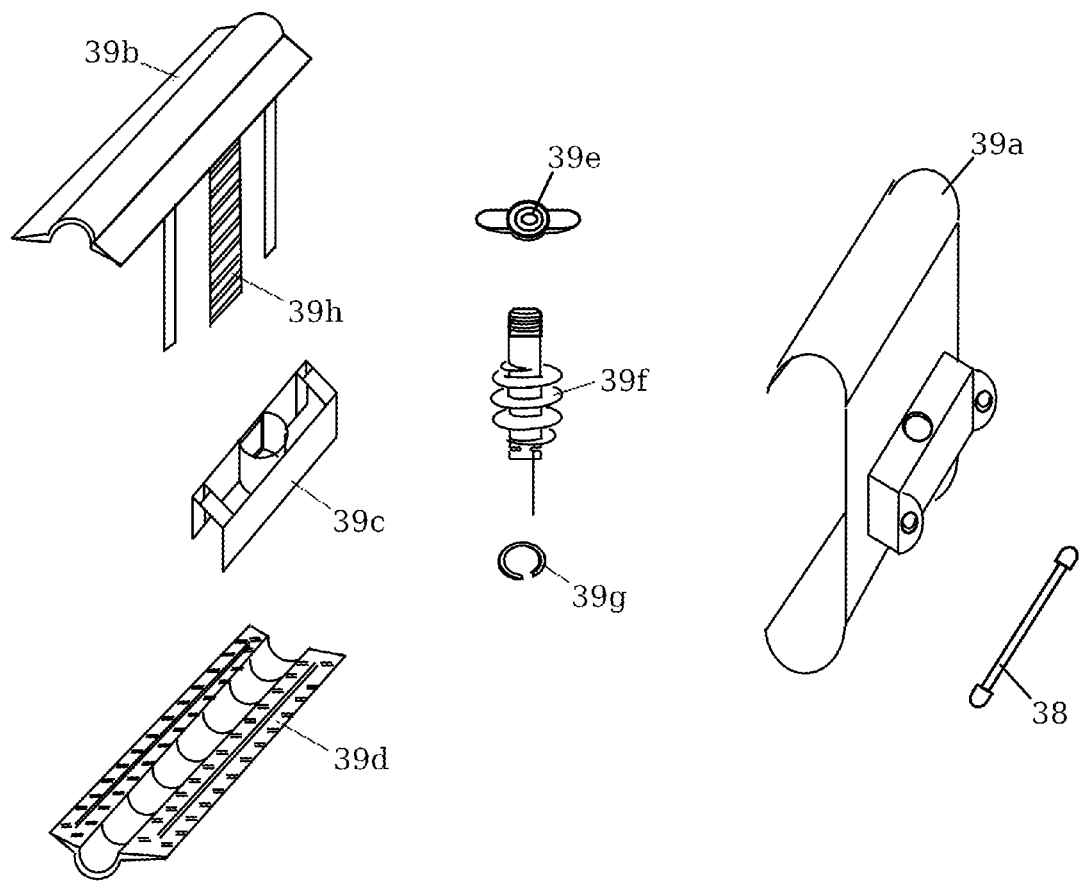
FIG. 10 illustrates the mechanics of a holder 39, showing box 39*a*, upper and lower jaws 39*b* and 39*d*, and pivot pin 38 for attachment to an extendable foot.

FIG. 10 illustrates the holder 39 in a three-dimensional view displaying various parts that mechanically actuate holder 39. The holder 39 comprises a metal box 39*a* about 3½" in height, two clamp jaws including an upper lip 39*b* and a lower lip 39d, and worm shaft 39f that engages with slotted plate 39h. The upper lip 39b is of a cylindrical hollow shape in the middle and flattened on the edges with teeth for gripping a bar of a luggage rack or a roof rack. Two guide bars are welded to the upper lip on one side perpendicular to the upper lip in order to guide and stabilize movement of the upper lip 39b. Centered between and parallel to the two guide bars is welded the slotted plate 39h of length about 2" that engages with the worm of worm shaft 39f. A retainer 39c about ½" in height is constructed with two parallel metal plates which are connected in their centers by a cylinder with a diameter equal to the diameter of the worm of worm shaft 39f, and at their ends by metal pieces, each of which has a hole at one end to accommodate one of the two guide bars of the upper clamp jaw 39b. The retainer 39c is fitted into a small box built into the back of the box 39a. The worm part of worm shaft 39f is inside the cylinder of retainer 39c, and the ends of the shaft part of worm shaft 39c extend through holes in the small box. One end of the worm shaft attaches to manual level 39e to turn the worm shaft and the other end of the worm shaft is retained by circular clip 39g. The lower clamp jaw 39d has a similar shape for gripping as the upper clamp jaw 39b. The lower clamp jaw 39d is retained inside box 39a parallel to and opposing the upper clamp jaw 39b, so that the bar of a luggage rack or a roof rack is clamped when the user turns the worm shaft 39c.

The variation in width between the upper and lower clamp jaws depends on the dimensions of the widest and narrowest bars of the luggage rack or roof racks. The adjustment technique for the holders and the specific dimensions given are one of many possible designs of the holders.

Figure 11:
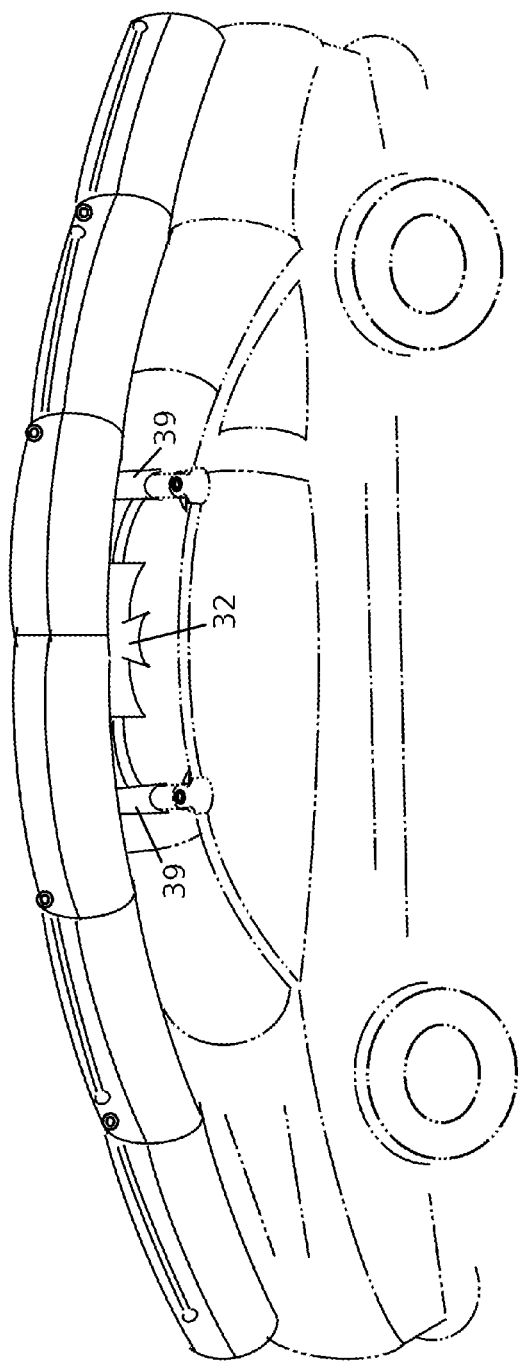
FIG. 11 illustrates a side view of the cover device in the open configuration on the top of an automobile.

FIG. 11 illustrates a side view of the cover device in the open configuration on the top of a vehicle having roof racks in lieu of a luggage rack. Positioned in the middle of the vehicle roof, top surface of the base 32 in the shape of a cross supports the cover device. On the side edge ends of the base 32, in the longitudinal direction of the vehicle, the two extendable feet are visible. Two holders 39, attached to the two ends of the extendable feet secure the cover device assembly. The holder 39 is adjusted to grip either the luggage rack of the vehicle if the vehicle has one or the roof racks if the vehicle does not have the luggage rack.

Figure 12:
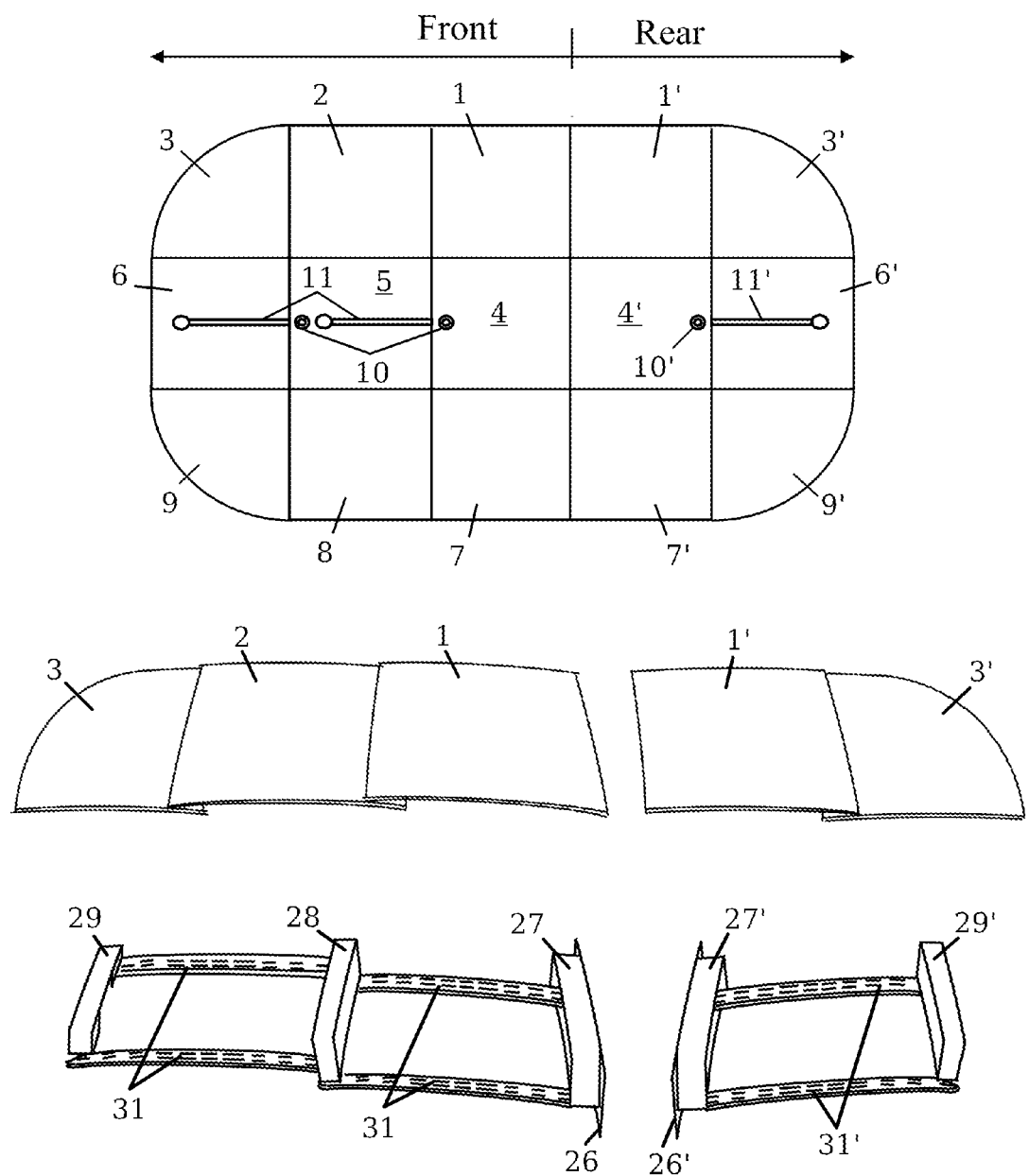
FIG. 12 illustrates a cover device in open configuration with rear section shorter than front section, the body groups of the rear section each having two, rather than three, cover pieces. The cover device is shown in top view, and three-dimensional aerial views show the cover pieces of a front and a rear section side body group, and the body groups of front and rear sections without cover pieces attached.

FIG. 12 illustrates a second embodiment to accommodate an automobile for which a shorter rear section is desired. This embodiment differs from the first embodiment in that the body groups of the rear section have two cover pieces, rather than three as for the front section. The body groups of the rear section are assembled as the body groups previously described and as used in the front section, but each body group of the rear section has only one pair of rails and has two cover pieces and two body supports instead of three. In comparison with body groups of the front section, the middle cover piece, middle body support, and the pair of rails attached to the middle body support would be omitted. The outermost cover piece as described for the first embodiment, with central rail 11 and hardware 12-15 corresponding to central or side body groups, would be attached to an outermost body support. Construction and operation of the cover device are otherwise as in the first embodiment.

A third embodiment accommodates an automobile for which a shorter rear section is desired by body groups of the rear section having shorter cover pieces and rails than body groups of the front section.

What is claimed is:

1. A mountable automobile roof cover device for use as both a snow shield and a sun shade, the cover device comprising:

a frame configured to be positioned on an automobile roof, the frame having one front-facing surface and one rear-facing surface, and a set of fixtures attached to each of the front-facing and rear-facing surfaces;

a plurality of body groups divided into two sections, the body groups in one section attached to the front facing surface using the sets of fixtures and the body groups in the other section attached to the rear facing surface using the other sets of fixtures, the body group including:

a plurality of body supports including an innermost body support and at least one outer body support, wherein the body support is inverted U shaped, comprising a flattened top and two downward sides; said innermost body support having an inner side facing away from the outer body supports;

a mounting plate attached to the inner side of the innermost body support; the mounting plate being fitted into the set of fixtures to attach the body group to the frame;

a plurality of cover pieces; each of the cover pieces attached to a corresponding body support, wherein the cover pieces comprise an outermost cover piece and at least one inner cover piece;

a plurality of rails in pairs; each pair of the rails attached to a corresponding body support, wherein a pair of slider feet are attached to bottoms of the downward sides of the body support; the pair of slider feet being fitted into the rails attached to an adjacent body support such that the outer body supports are slidable along the rails and extendable to the extent allowed by the length of the rails, and retractable inwards so that the cover pieces nest one under another;

a locking device installed on surfaces of the cover pieces, wherein when the cover pieces within one body group are in an extended or fully retracted position, the cover pieces interlock with each other by the locking device; and a securement device configured to secure two body groups to each other so that the body groups of each of the sections are extendable and retractable as a unit.

2. The cover device of claim 1, further comprising:
a base and two extendable feet attached to the base, one extendable foot extending forward to connect the base with one rack, and another extendable foot extending rearward to connect the base with another rack, one of the racks being fore and another rack being aft of the base, the base positioned underneath the frame so as to provide support for the frame.

3. The cover device of claim 2, further comprising:
a pair of holders attached to the extendable feet for clamping to the racks.

4. The cover device of claim 2, wherein the racks are bars of a luggage rack.

5. The cover device of claim 2, wherein the racks are roof racks, the roof racks being transversely mounted on the roof.

6. The cover device of claim 1, wherein the frame includes:
a central frame part and two side frame parts, the two side frame parts attached to each of the side edges of the central frame part respectively.

7. The cover device of claim 1, wherein the cover pieces are rigid or semi-rigid.

8. The cover device of claim 1, wherein the cover pieces are made from at least one material selected from the group consisting of: metal, plastic, and fiberglass.

9. The cover device of claim 1, wherein the locking device includes:

a central rail on one cover piece and a button assembly, the button assembly being engaged to the central rail and attached to an adjacent cover piece, such that when the two cover pieces are extended or fully retracted, the button assembly travels to a position of the central rail to be locked in position.

10. The cover device of claim 1, wherein the front-facing and rear-facing surfaces of the frame have a plurality of holes.

11. The cover device of claim 1, further comprising:
a peg attached to the mounting plate of the body group, such that when the body group is attached to the frame, the peg can be fitted into a hole of the frame.

12. The cover device of claim 1, wherein the set of fixtures includes:
a pair of retainers and a horizontal bar, for holding and supporting the mounting plate of the body group.

13. The cover device of claim 1, wherein the means securing two body groups to each other includes a set of cleats.

* * * * *